United States Patent
Dusak et al.

(10) Patent No.: US 12,263,421 B2
(45) Date of Patent: Apr. 1, 2025

(54) METHOD AND APPARATUS FOR PRODUCING A FILTER DEVICE

(71) Applicant: Robert Bosch GmbH, Stuttgart (DE)

(72) Inventors: Richard Dusak, Libin (CZ); Zdenek Uhlir, Trebic (CZ); Alberto Castillo Rueda, Aranjuez (ES); Jan Mueldner, Ceske Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 18/251,288

(22) PCT Filed: Oct. 20, 2021

(86) PCT No.: PCT/EP2021/079022
§ 371 (c)(1),
(2) Date: May 1, 2023

(87) PCT Pub. No.: WO2022/090007
PCT Pub. Date: May 5, 2022

(65) Prior Publication Data
US 2023/0405497 A1    Dec. 21, 2023

(30) Foreign Application Priority Data

Nov. 2, 2020  (DE) .................. 10 2020 213 744.7
Oct. 19, 2021 (DE) .................. 10 2021 211 780.5

(51) Int. Cl.
*B01D 39/14*    (2006.01)
*B01D 29/01*    (2006.01)
(Continued)

(52) U.S. Cl.
CPC ........... *B01D 29/012* (2013.01); *B01D 29/05* (2013.01); *B01D 39/14* (2013.01); *B01D 35/027* (2013.01);
(Continued)

(58) Field of Classification Search
CPC ...... B01D 39/14; B01D 29/012; B01D 39/16; B01D 35/027
See application file for complete search history.

(56) References Cited

U.S. PATENT DOCUMENTS

2013/0264271 A1* 10/2013 Yoshioka ............ A61M 1/3633
210/407

FOREIGN PATENT DOCUMENTS

DE    102012222943 A1    6/2014
DE    102013001843 A1    8/2014
(Continued)

OTHER PUBLICATIONS

Translation of International Search Report for Application No. PCT/EP2021/079022 dated Feb. 14, 2022 (pages).

*Primary Examiner* — Jeffry H Aftergut
(74) *Attorney, Agent, or Firm* — Michael Best & Friedrich LLP

(57) ABSTRACT

The invention relates to a method for producing a filter device (1) for filtering a hydrophilic liquid, comprising a flat filter element (10) which is permeable to the liquid, wherein the filter element (10) has a delimited filter region (11) which is coated with a hydrophobic agent. The following steps are carried out:
 a) providing the flat filter element (10) which has in particular a nonwoven filter web (13) lying between a mesh support layer (14) and a spun-bonded fabric (15),
 b) producing a compressed annular boundary region (16) for the filter region (11),
 c) applying the agent onto the filter region (11) of the filter element (10), and
 d) obtaining the filter device (1).

17 Claims, 3 Drawing Sheets

(51) Int. Cl.
*B01D 29/05* (2006.01)
*B01D 35/027* (2006.01)
*B01D 39/16* (2006.01)

(52) U.S. Cl.
CPC ............. *B01D 2239/0428* (2013.01); *B01D 2239/0627* (2013.01); *B01D 2239/0654* (2013.01); *B01D 2239/0672* (2013.01); *B01D 2239/10* (2013.01)

(56) References Cited

FOREIGN PATENT DOCUMENTS

| DE | 102017209039 | A1 | * | 6/2018 |
| EP | 1520609 | A1 | * | 4/2005 |
| WO | 2018219549 | A1 | | 12/2018 |

* cited by examiner

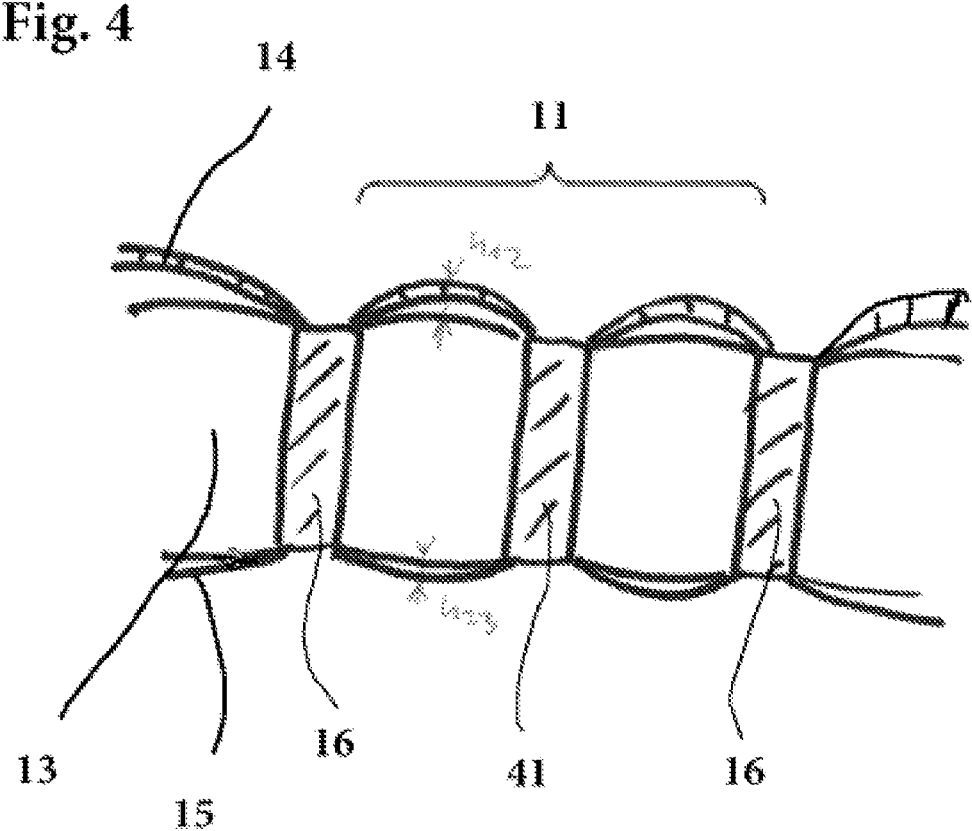

METHOD AND APPARATUS FOR PRODUCING A FILTER DEVICE

BACKGROUND

The invention relates to a method for producing a filter device for filtering a hydrophilic liquid, comprising a flat filter element which is permeable to the liquid, wherein the filter element has a delimited filter region which is coated with a hydrophobic agent.

Further, the invention relates to an apparatus for producing such a filter device.

Methods and apparatuses of the aforementioned type are known from the prior art. For example, the disclosure document DE 10 2012 222 943 A1 discloses a filter element for filtering or for filtering a hydrophilic liquid having at least one hydrophobic filter region at least prior to its first intended use. The hydrophobic filter region in the otherwise hydrophilic filter element has the advantage that, upon initial filling of a tank comprising the filter element, in particular with an aqueous urea solution for exhaust after-treatment, air can escape from the filter device. The hydrophobic filter region ensures that a passageway for air is created for at least a sufficient period of time so that an active removal of air bubbles from the filter device is not necessary. Normal filtering equipment typically surrounds a filter space in which an intake or outtake site opens so as to ensure that only filtered medium or filtered fluid reaches the outtake site. By having the filter space closed, air can only escape from the filter space through the filter element. The advantageous configuration provides a targeted region for the air to escape, which allows an advantageous filling operation, in particular during the initial filling of the tank.

In order to configure the hydrophobic filter region, it is proposed in the aforementioned publication to apply an epilamizing agent to this filter region.

SUMMARY

The method according to the invention, has the advantage that the hydrophobic filter region is produced in a simple and inexpensive manner while allowing for a very precise arrangement and configuration of the filter region. According to the present invention, a flat filter element is provided. The filter element is in particular a nonwoven filter web, as is already used in known tank apparatuses, in particular for exhaust after-treatment means. Preferably, the nonwoven filter web lies between a mesh support layer and a spun-bonded fabric. The support layer serves in particular to shape the filter element, because the nonwoven filter web itself is hardly dimensionally stable. The support layer keeps the filter device shape-stable overall. The spun-bonded fabric ensures that the filter element rests against the support layer and thus advantageously stretches out or separates the aforementioned filter space from the remaining tank volume. Further, an annular boundary region for the filter region is established in the filter element, in which the material of the filter element is compressed. The compression in the boundary region separates the filter region from the remaining filter element. Then, the hydrophobic agent is applied to the filter region of the filter element and the filter device is obtained. The advantageous boundary region ensures that the agent applied to the filter region does not penetrate the boundary region and can enter adjacent portions or regions of the filter element. Thus, the hydrophobic configuration of the filter element is advantageously delimited to the selected filter region.

According to a preferred further development of the invention, the filter element is pressed between a support element and a tubular punch, so that the annular boundary region results in the filter element, in which the material of the filter element is compressed by being pressed together. Then, the hydrophobic agent is applied to the filter region within the tubular punch. Due to the compression of the filter element between the tubular punch and the support element and the resulting annular compression, the agent within the filter region penetrates into the unpressed filter material of the filter element and does not penetrate out of the filter region into adjacent regions of the filter element through the compressed portion of the filter element. As a result, the agent is retained within the filter region and can sufficiently act on the filter material in order to make the filter element in the filter region hydrophobic. If sufficient means has been applied or introduced, the pressing is released, the punch is removed from the support element, and the filter element for obtaining the filter device is removed. If the filter element has already been held between the support layer and the spun-bonded fabric during pressing, the filter device is now finished. If only the filter element has been placed between the support element and the punch, it can now be arranged between the support layer and the spun-bonded fabric and connected to the filter element treated with the hydrophobic means.

According to a preferred further development of the invention, the boundary region is produced in addition to or alternatively to the pressing by a materially locking connection, in particular by a weld connection, of several layers of the filter element, in particular the nonwoven filter web with the support layer and the spun-bonded fabric. Due to the materially locking connection, the filter element is also compressed at the boundary region such that leakage of still liquid hydrophobic means out of the delimited filter region into adjacent regions of the filter element is prevented. This also results in the aforementioned advantages.

According to a preferred embodiment of the invention, the pressing is maintained after application of the agent onto the filter region for a predetermined period of time. This ensures that the agent is sufficiently widely distributed in the filter material and permanently bonds to the filter material, at least such that the agent does not immediately separate from the filter element during the initial filling of the tank or when the filter element is first wetted with the liquid, but rather at least remains on the filter element until sufficient air has escaped through the filter region of the element.

Preferably, the filter element is annularly compressed between the support element and the tubular punch, as already described above. The annular shape results in a closed boundary for the filter region, which allows for the precise arrangement of the filter region in the filter element. The annular shape can be circular, oval, or polygonal.

Particularly preferably, an epilamizing agent is used as a hydrophobic or hydrophobing agent. This results in an advantageous hydrophobic configuration of the filter region. In particular, a liquid, for example a volatile solvent, is used as the epilamizing agent, into which a fluorinated polymer (fluoroplastic) is dissolved. After application onto the filter region, the solvent is in particular volatilized, and the fluoropolymer remains on the surface of the filter material in the filter region such that there is reduced surface tension in the filter region, thereby providing the hydrophobic effect in the delimited filter region. Furthermore, it is preferably provided that the agent is applied by means of a feed line inserted into the punch, in particular under pressure, so that the agent advantageously penetrates quickly into the filter material of the filter element.

The apparatus according to the invention is particularly suitable for carrying out the above-mentioned method. The apparatus is characterized by a device for generating an annular compressed boundary region surrounding the filter region as well as by an apparatus for applying the agent onto the delimited filter region. Due to the annular production of the boundary region by the device, an enclosure and delimitation of the filter region intended to be hydrophobic is securely ensured. With the apparatus, the agent is specifically applied to the delimited filter region so that the above-mentioned advantages result. In particular, the apparatus is characterized by a support element on which the filter element can be deposited, by a tubular punch which can be arranged opposite the support element, and preferably also by an actuator device for pressing the filter element between the punch and the support element. This, too, results in the aforementioned advantages.

In particular, the support element is level, so that the filter element can rest flat on the support element. Optionally, the support element comprises a recess in the filter region or in the region lying within the punch, so that the agent can completely penetrate the filter element, and in particular can also wet a bottom side of the filter element, which then does not rest on the support element but rather extends across the recess. Furthermore, the apparatus preferably comprises a pressure device for applying the agent, in particular for driving the agent into the filter element. For example, the pressure device is a second punch, the outer contour of which substantially corresponds to the inner contour of the tubular punch, and which has a closed end face so as to drive the applied means into the filter element. Alternatively, the pressure device is a conveying means through which the agent is applied onto the filter element with a sufficiently high hydraulic pressure so that it also penetrates into the filter element.

BRIEF DESCRIPTION OF THE DRAWINGS

Further advantages and preferred features and combinations of features result in particular from the above-described and from the claims. The invention will be explained in greater detail hereinafter with reference to the drawings. Shown are:

FIG. 4 a further embodiment example of the filter device.

DETAILED DESCRIPTION

Figure 1:
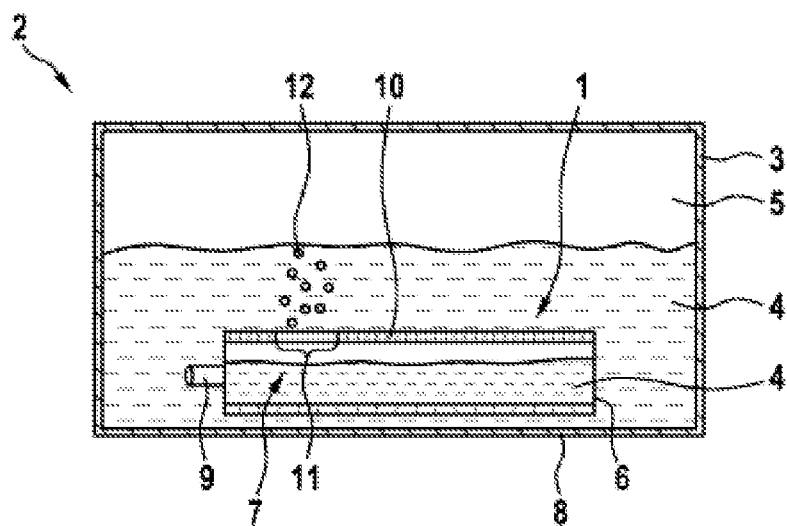
FIG. 1 a tank apparatus having an advantageous filter device in a simplified side view, FIG. 2 a first embodiment example of the filter device in a simplified sectional view, FIGS. 3A and 3B a second embodiment example of the advantageous filter device with an apparatus for production.

FIG. 1 shows, in a simplified side view, an advantageous filter device 1, which is arranged in a reservoir 2 of a tank apparatus 3. An aqueous urea solution 4 is held in the reservoir 3, wherein the urea solution 4 fills only a portion of the reservoir 2, such that a space 5 with air remains above the liquid urea solution.

The filter device 1 encloses a space 7 within the reservoir 2 and is arranged close to a bottom 8 of the reservoir 2. The filter device 1 is also associated with a removal port 9, which opens at one end in the space 7 and is connected to a removal apparatus, for example a feed pump or the like, at the other end. Liquid volume of the exhaust after-treatment agent or the aqueous urea solution 4 can be removed from the space 7 through the removal port 9. The filter device 1 comprises, for example, a housing 6, on which the removal port 9 and a filter element are arranged, such that the housing 6 and the filter element 10 enclose the space 7. According to the present embodiment example, the filter element 10 forms the cover region of the housing 6 or the filter device 1. In particular, the filter element 10 is held on the housing 6 while spanned in a plane.

The filter element 10 is substantially configured so as to be permeable for the liquid, i.e. the aqueous urea solution 4, i.e. so as to be hydrophilic. Only in a filter region 11 is the filter element 10 configured so as to be hydrophobic. This has the advantage that, when filling the reservoir 2 with the liquid 4, air can escape from the filter device 1 through the hydrophobic filter region 11, as indicated by bubbles 12 in FIG. 1, which can float upwards through the filter region 11, while liquid can permeate through the remaining filter element 10 into the filter device 1, or into the space 7 of the filter device 1. Thus, a complete filling of the filter device 1 with the liquid 4 is ensured, so that an intake of the liquid 4 from the filter device 1 is also ensured at all times by the removal port 9.

Figure 2:
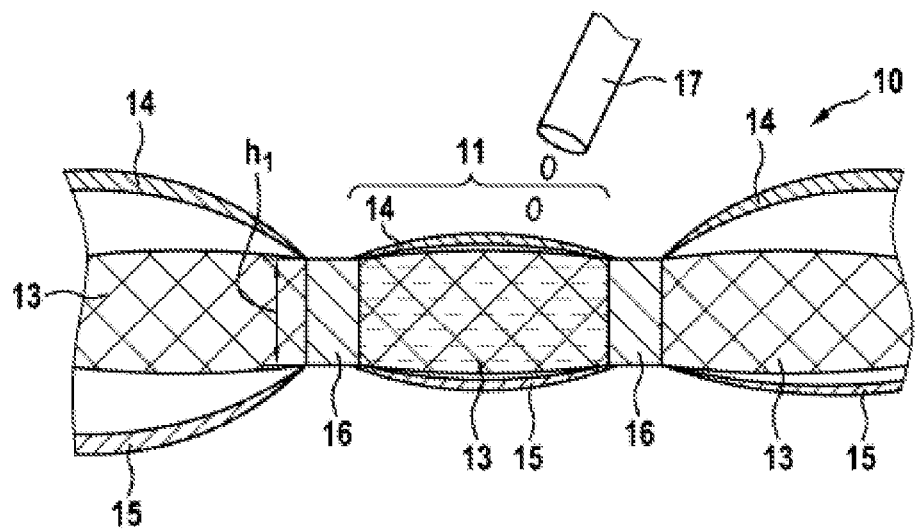

FIG. 2 shows, in an enlarged sectional view, the filter element 10 in the region of the filter region 11. The filter element 10 is configured in multiple layers. For this purpose, the filter element 10 comprises a nonwoven filter web 13, which lies between a mesh support layer 14 and a spunbonded fabric 15.

To delimit the filter region 11 from the remaining filter element 10, the various layers 13, 14, 15 are connected to one another in a materially locking fashion, in particular welded and/or glued, at the outer edge of the filter region 11. This results in a boundary region 16, which extends in particular annularly around the filter region 11 and thus delimits it externally. The boundary region 16 is thus formed to be circularly annular, oval-shaped, polygonal, or optionally as an irregular, in any case closed, line region. If the hydrophobic means is now applied to the filter region 11, for example using an access line or supply line 17, as indicated in FIG. 2, the agent remains within the filter region 11 and does not pass into adjacent regions of the filter element 10, in particular the nonwoven filter web 13. This ensures that the hydrophobic configuration of the filter element 10 is and remains delimited to the desired filter region 11. In particular, for the production of the boundary region 16, the layers 13, 14, 15 are first pressed together so that the total height hi is smaller in the region of the boundary region 16 of the filter element 10 than in the remaining region. This compresses the boundary region 16 and improves the resulting sealing effect for a filter region 11 against the adjacent portions of the filter element 10.

FIG. 3 shows a further embodiment example of the filter element 10 as well as its production, in which a materially locking connection is omitted.

Figure 3A:
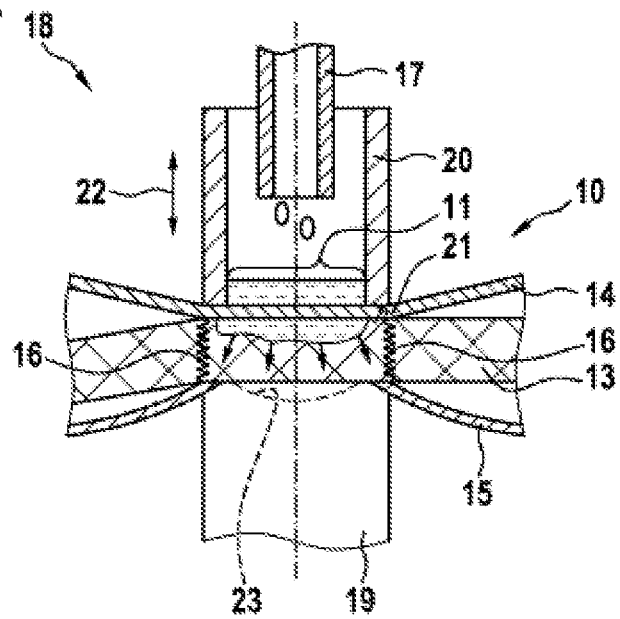

An advantageous apparatus 18 is used for this purpose, which also comprises the supply line 17. Furthermore, the apparatus 18 comprises a support element 19, on which the filter element 10 can be applied laminarly. Opposite the support element 19, a tubular punch 20 is arranged, which faces the support element 19 on the front side, such that the annular end wall 21 of the punch 20 opposes the support element 19. The outer diameter of the support element 19 is at least as large as the outer diameter of the punch 20. The punch 20 and/or the support element 19 are movable towards and away from one another, as indicated by a double arrow 22 in FIG. 3A. To produce the filter element 10, it is placed between the support element 19 and the punch 20 on the support element 19. It is then pressed between the punch 20 and the support element 19, for example by moving the punch 20 towards the support element 19 as shown in FIG. 3A. The layers 13, 14, 15 of the filter element 10 are pressed together, in particular along the annular end wall 21 of the tubular punch 20. This results in an annular pressing region or the boundary region 16 in the filter element 10, as a result of which a sealing of the filter region 11 lying within the tubular punch 20 against the external portions of the filter element 10 is caused. In the compressed state, the hydrophobic agent, in particular the hydrophobic liquid, is now filled into the punch 20 by means of the supply line 17 and thus applied to the filter element 10 in the filter region 11. The hydrophobic means penetrates into the filter element 10 in the filter region 11 in order to achieve the aforementioned effect. Due to the compression, it is prevented from reaching adjacent regions of the filter element 10.

Figure 3B:
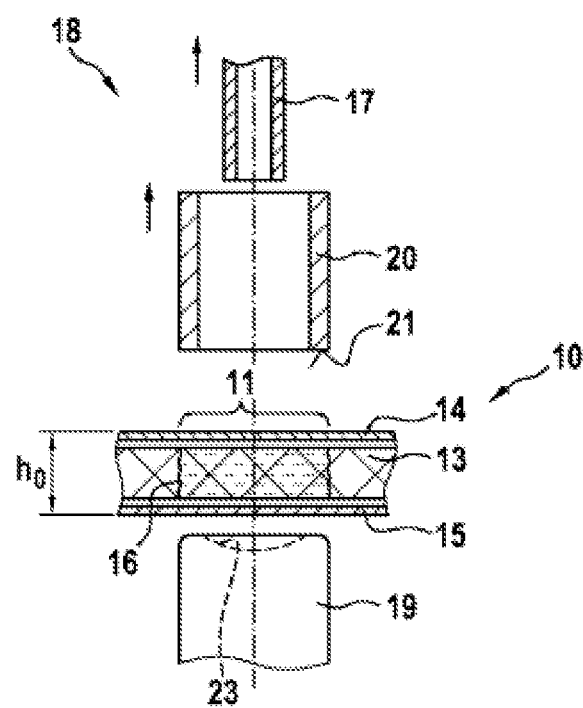

After a predetermined period of time, the punch 20 and the support element 19 are separated again, and the filter element 10 is thus released, as shown in FIG. 3B. The compression is thereby lifted, so that the seal of the filter region 11 against the adjacent regions of the filter element 10 is also lifted. The time period is selected such that the compression is not lifted until the hydrophobic agent has dried or the filter element 10 has been sufficiently wetted and coated.

In particular, an epilamizing agent is used as a hydrophobic agent, in particular a volatile solvent, into which a fluorinated polymer (fluoroplastic) is dissolved.

When the punch 20 and support element 19 have been separated from one another, the filter element 10 is finished and comprises a filter region 11, which still functions as a hydrophobic agent during at least a first filling operation and ensures the escape of air from the filter device 1, as already described above.

The last described production method has the advantage that, by contrast to the previous production methods, the filter element 10 is configured as a whole and has, in particular, no usage site with a reduced height h. Rather, after the production process of the filter region 11, the filter element 10 returns to its starting height ho, which is greater compared to the height hi. This results in a planar filter element 10, which can advantageously be integrated into the tank apparatus 2.

Optionally, the support element 19 also comprises a recess 23 in the region of the filter region 11, such that the hydrophobic means can also wet the rear or bottom side of the filter element 10.

FIG. 4 shows, in an enlarged sectional view, the filter element 10 in the region of the filter region 11 in an alternative embodiment. The filter element 10 is configured in a multi-layer fashion, analogous to the embodiment of FIG. 2. For this purpose, the filter element 10 comprises a nonwoven filter web 13, which lies between a mesh support layer 14 and a spun-bonded fabric A boundary region 16 is also provided. In addition to the embodiment according to FIG. 2, a further compression region 41, in particular a punctiform, substantially centrally arranged compression region, is provided, which is enclosed by the boundary region 16. The compression region 41 serves to bring the various layers, in the present case the nonwoven filter web, support layer, and spun-bonded fabric, as close together as possible, with a given lateral extension of the filter region 11, such that a maximum height h12 of a clearance in the filter region 11 between the support layer 14 and the nonwoven filter web 13 and/or a maximum height h23 of a clearance in the filter region 11 between the nonwoven filter web 13 and the spun-bonded fabric is preferably in a range between 0 millimeters and 0.8 millimeters and very preferably about millimeters. This is particularly true for a filter region 11 having an average diameter of approximately 1 centimeter. A punctiform configuration of the further compression region 41 with a diameter of approximately 4 millimeters is in particular well suited for this purpose. As a result, i.e. with a produced sufficient proximity of the three layers 14, 13, and 15 to one another in the region of the filter region 11, it can be ensured that all three layers 14, 13, and 15 can be saturated with the epilamizing agent and thus waterproofed when the epilamizing agent is applied from one side. The sufficient proximity of the three layers to one another ensures a sufficiently good transfer or passage of the epilamizing agent through all three layers in the region of the filter region 11 and thus ensures the occurrence of the desired effect, namely hydrophobization in the filter region 11 through all three layers, through which air can reliably pass upon an initial use of the filter device in the filter region 11.

Similar to the description in connection with the boundary region 16, as already described in FIGS. 1 to 3, the further compression region 41 can only exist during the production process, i.e. until the end of the waterproofing/epilamization, or can be permanently introduced into the material. The latter can be achieved mechanically, if necessary under heat exposure, by chemical means, or by a welding process.

The invention claimed is:

1. A method for producing a filter device (1) for filtering a hydrophilic liquid, the filter device comprising a flat filter element (10) which is permeable to the hydrophilic liquid, wherein the filter element (10) has a delimited filter region (11) which is coated with a hydrophobic agent, the method comprising:
   providing the flat filter element (10),
   producing a compressed annular boundary region (16) for the filter region (11),
   applying the hydrophobic agent onto the filter region (11) of the filter element (10), and
   obtaining the filter device (1).

2. The method according to claim 1, wherein the boundary region (16) is produced by pressing the filter element (10) between a support element (19) and a tubular punch (20) and wherein the hydrophobic agent is applied onto the filter element (10) in the pressed state.

3. The method according to claim 1, wherein the boundary region (16) is produced by a materially locking connection of several layers of the filter element (10) with one another.

4. The method according to claim 2, wherein the pressing is maintained after the introduction of the hydrophobic agent for a predetermined period of time.

5. The method according claim 2, wherein the filter element (10) is annularly pressed between the support element (19) and the tubular punch (20).

6. The method according to claim 1, wherein an epilamizing agent is used as the hydrophobic agent.

7. The method according to claim 1, wherein the flat filter element (10) has a nonwoven filter web (13) lying between a mesh support layer (14) and a spun-bonded fabric (15).

8. The method according to claim 7, wherein a compression region (41) is produced in the filter region (11), which compression region is enclosed by the boundary region (16), such that, when applying the hydrophobic agent as a result of a sufficient proximity of the nonwoven filter web (13) to the support layer (14) on the one hand and the spun-bonded fabric (15) on the other hand, the agent can hydrophobize the nonwoven filter web, the support layer, and the spun-bonded fabric.

9. The method according to claim 7, wherein a maximum height (h12) of a clearance in the filter region (11) between the support layer (14) and the nonwoven filter web (13) and/or a maximum height (h23) of a clearance in the filter region between the nonwoven filter web (13) and the spun-bonded fabric (15) lie in a range between 0 millimeters and 0.8 millimeters.

10. The method according to claim 3, wherein the materially locking connection is a weld connection.

11. The method according to claim 8, wherein the compression region (41) is a punctiform, substantially centrally arranged compression region.

12. The method according to claim 9, wherein the maximum height (h12) of the clearance in the filter region (11) between the support layer (14) and the nonwoven filter web (13) and/or the maximum height (h23) of the clearance in the filter region between the nonwoven filter web (13) and the spun-bonded fabric (15) is about 0.6 millimeters.

13. An apparatus (18) for producing a filter device (1) for filtering a hydrophilic liquid, wherein the filter device (1) comprises a flat filter element (10), which is permeable to liquid, wherein the filter element (10) is equipped with a hydrophobic agent in a delimited filter region (11), wherein the apparatus includes a device for generating an annular boundary region (16) enclosing the filter region (11), as well as a device for applying the hydrophobic agent onto the filter region (11).

14. The apparatus according to claim 13, wherein the device comprises a tubular punch (20) and a support element (19), between which the filter element (10) can be arranged and pressed by the punch (20) and the support element (19) in order to produce the boundary region (16).

15. The apparatus according to claim 13, wherein the device is configured so as to produce a materially locking connection extending annularly around the filter region (11).

16. The apparatus according to claim 14, wherein the support element (19) is configured so as to be level or comprises a recess (23) in a region of the filter region (11).

17. The apparatus according to claim 15, wherein the materially locking connection is a weld connection.

* * * * *